Feb. 2, 1954
R. C. MOSES
2,668,233
AUTOMATIC NOISE LIMITER
Filed July 19, 1948
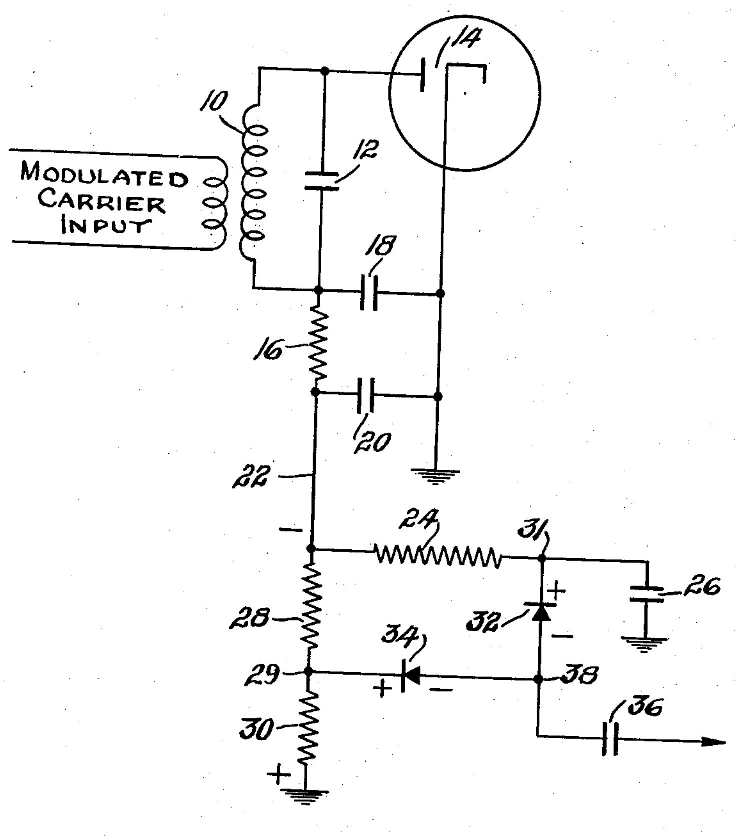
INVENTOR.
Robert C. Moses
BY A. B. Richardson
Attorney Patented Feb. 2, 1954

2,668,233

UNITED STATES PATENT OFFICE 2,668,233

AUTOMATIC NOISE LIMITER

Robert C. Moses, Swampscott, Mass., assignor to Sylvania Electric Products Inc., a corporation of Massachusetts Application July 19, 1948, Serial No. 39,572

3 Claims. (Cl. 250—20)

The invention relates to wave-filtering circuits, and particularly to circuits for suppressing burst voltages that appear as noise in sound reproducers. A novel circuit is provided embodying certain simple and distinctive arrangements for minimizing noise, based both on the premise that noise is a sudden voltage excess over the normal amplitude of the desired signal, and on the further premise that the noise burst or individual components of the noise burst are of brief duration. The invention will be clear from the following disclosure and illustrative embodiment. In this specification reference is made to the accompanying drawing which is the wiring diagram of a preferred but illustrative embodiment of the invention.

The novel portion of the circuit shown has a varying negative voltage applied to it, with respect to ground as a datum. In the present instance, the signal is the output of the demodulator in an amplitude-modulation receiver plus random disturbances, commonly of electrical spark origin. Received signals are applied to coil 10, tuned to carrier resonance by condenser 12. This signal voltage is rectified by diode 14 and carrier-frequency components of the demodulated or rectified signal are filtered by the pi-network including resistor 16 and condensers 18 and 20. In line 22, therefore, a negative voltage appears comprised of demodulated signal plus rectified carrier components which varies with respect to ground. Between wire 22 and ground as signal input terminals, resistor 24 and condenser 26 are connected in series. This resistor and condenser are of such values as to have a very long time constant in relation to the period of the lowest-frequency component of the desired signal appearing at wire 22. A voltage divider comprising series-connected resistors 28 and 30 are also connected between wire 22 and ground. Between the junction 29 of resistors 28 and 30 and the junction 31 of condenser 26 and resistor 24 are a pair of crystal diodes connected in series-opposition. Diode 32 is so connected to junction 31 as to oppose the discharge of condenser 26, and diode 34 is so connected to junction 29 as to pass signals within usual voltage range. The signal output is transmitted through coupling condenser 36 to a utilization circuit.

Condenser 26 charges to a constant level proportional to both average (rectified carrier) and peak values of the signal voltages at wire 22. Should the signal-voltage average change, the charge on condenser 26 could change only slowly, this current flowing almost entirely through large resistor 24. There is also a flow of leakage current through diode 32. Junction 38 of diodes 32 and 34 at all times remains negative with respect to all parts of voltage divider 28 and 30 except near the end remote from ground. Signal voltages will pass through rectifier 34 in the forward-conduction driection and will be transmitted to the utilization circuit, so long as the instantaneous value of the voltage at junction 29 does not exceed the steady voltage at junction 31. The tap 29 in voltage divider 28, 30 is chosen to reduce the instantaneous signal peaks to the level appearing at junction 31, and is the mid-point for 100% modulated signals input to the demodulator.

Diodes 32 and 34 represent a voltage divider between points 29 and 31 with the tap or junction 38 normally very close to point 29 and relatively removed, in terms of resistance values, from point 31. The relative resistances change, and the tap in effect shifts close to the opposite end of the voltage divider, when a voltage burst appears at point 29. Diode 34 is then highly effective in preventing signal voltage from reaching condenser 36 because the signal current would then flow through the back-resistance of that diode; and such fraction of the signal as might exceed the potential at point 31 would be efficiently returned to ground through diode 32 in the forward-conductive direction and through condenser 26. The action of this self-reversing voltage divider is thus seen to be effective to transmit normal signals through a minimum series resistance to the output point, and to sharply limit the signal rise with respect to an established level by injecting a maximum series resistance while providing a minimum shunt resistance at that point.

Representative values of the peak-limiting circuit in an amplitude-modulation receiver are as follows:

| | | |
|---|---|---|
| Resistor 24 | megohn | 1.0 |
| Condenser 26 | microfarad | 0.1 |
| Resistor 28 | ohms | [1] 220,000 |
| Resistor 30 | do | [1] 220,000 |
| Diodes 32, 34 | | 1N34 |
| Condenser 36 | microfarad | 0.05 |

[1] These values should be adjusted in relation to each other for effective limiting consistent with permissible distortion.

The resistance of 1N34 germanium crystal diodes varies between roughly 200 ohms in the forward-conducting direction and 750,000 ohms in the backward-conducting direction.

It was noted that point 31 is held at a stable value proportional to this signal strength. It will change with drifting signal strength. But where the signal voltage does not change or where clipping action at a fixed level is desired, a primary cell or other direct-current supply may be connected between point 31 and ground in substitution for condenser 26 and resistor 24. Other detailed modifications will occur to those skilled in the art, as well as applications in circuits other than the amplitude-modulated signal receiver included in the foregoing description. Therefore, I desire the appended claims to be interpreted as broadly as is consistent with the spirit and scope of the invention.

What is claimed is:

1. A noise-suppression circuit in a signal translator comprising a pair of input terminals, means providing across said terminals the signal to be transmitted and in addition any unwanted noise that may be present therein, a pair of series-connected resistors between said terminals, an additional resistor and a condenser connected in series to said terminals and having a time constant long in relation to the longest period of any desired signal component, a voltage divider comprising a pair of oppositely polarized series-connected diodes of the point-contact crystal type connected between the junction of said pair of resistors and the junction of said additional resistor to said condenser, and signal output coupling means to the junction of said diodes and the input terminal to which said condenser is connected.

2. A limiter including a pair of input terminals, means for applying across said terminals the signal to be transmitted and any noise that may be present therein, a pair of resistors connected in series across said terminals, a long time constant circuit connected in parallel with said series-connected resistors, said long time constant circuit having a third resistor and a condenser connected in series, a first crystal diode having a terminal connected to said long time constant circuit directly between said third resistor and said condenser, and a second crystal diode connected to the remaining terminal of said first crystal diode and to an intermediate terminal of said series-connected resistors, said diodes being connected in series-opposition, and a signal output circuit connected to the common connection of said diodes, whereby the high back-resistance path afforded by said first crystal diode is effective to apply forward-conduction bias potential from the condenser that is charged during operation to the second crystal diode and to prevent substantial discharge of the condenser during application of average signals, and whereby rise of signal potential at the output circuit above the condenser potential due to leakage through the second crystal diode is limited by forward conduction of the first diode to the condenser.

3. A noise-suppression circuit in a signal translator comprising a rectifying demodulator having a resistance and capacitance filter providing a steady bias voltage at a pair of demodulator output points, a pair of series connected resistors connected between said demodulator output points for signal and bias energization, an additional resistor and a condenser connected in series to said output points and having a time constant long in relation to the longest period of any desired signal component, a pair of oppositely polarized series-connected crystal diodes connected between the junction of said pair of resistors and the junction of said additional resistor to said condenser, the diode connected to the latter junction being polarized to present a high resistance to the voltage developed on said condenser by said demodulator during operation thereof, and the junction of said diodes and the output point to which said condenser is connected constituting signal output terminals and signal output coupling means connected to such signal output terminals.

ROBERT C. MOSES.

References Cited in the file of this patent

UNITED STATES PATENTS

| Number | Name | Date |
|---|---|---|
| 2,239,906 | Tuxen | Apr. 29, 1941 |
| 2,279,819 | Fyler | Apr. 14, 1942 |
| 2,301,620 | Fowler | Nov. 10, 1942 |
| 2,422,976 | Nicholson | June 24, 1947 |
| 2,439,872 | Sanders | Apr. 20, 1948 |
| 2,453,958 | Andressen | Nov. 16, 1948 |
| 2,493,045 | Toth | Jan. 3, 1950 |
| 2,550,715 | Norton | May 1, 1951 |

FOREIGN PATENTS

| Number | Country | Date |
|---|---|---|
| 413,333 | Great Britain | July 19, 1934 |
| 118,548 | Australia | Nov. 30, 1942 |

OTHER REFERENCES

QST, March 1947, page 2. Advertisement by Sylvania Electric Co.